United States Patent [19]

Lofthus et al.

[11] Patent Number: 5,781,451
[45] Date of Patent: Jul. 14, 1998

[54] METHOD AND APPARATUS FOR TRACKING THE MOTION OF AN IMAGING MEMBER WITH A LINE WRITING DEVICE USING A RATIONAL ELECTRONIC GEARBOX

[75] Inventors: Robert M. Lofthus, Honeoye Falls; Stuart A. Schweid, Henrietta, both of N.Y.

[73] Assignee: Xerox Corporation, Stamford, Conn.

[21] Appl. No.: 787,186

[22] Filed: Jan. 21, 1997

[51] Int. Cl.$^6$ ............................................. G01C 25/00
[52] U.S. Cl. .................... 364/571.01; 364/167.01; 364/174
[58] Field of Search .................... 364/167.01, 174, 364/175, 565, 561, 571.01–571.08; 277/18, 17; 318/561, 632; 355/77, 84; 369/44.28, 43

[56] References Cited

U.S. PATENT DOCUMENTS

| | | | |
|---|---|---|---|
| 4,427,933 | 1/1984 | Wagener et al. | 318/711 |
| 4,485,452 | 11/1984 | Cording et al. | 364/565 |
| 4,697,127 | 9/1987 | Stich et al. | 318/561 |
| 4,716,535 | 12/1987 | Yoshida et al. | 364/565 |
| 4,972,350 | 11/1990 | Sander et al. | 369/32 |
| 4,980,718 | 12/1990 | Salter et al. | 355/77 |
| 5,033,039 | 7/1991 | Richgels | 369/43 |
| 5,050,146 | 9/1991 | Richgels et al. | 369/32 |
| 5,237,521 | 8/1993 | Raj et al. | 364/561 |
| 5,469,414 | 11/1995 | Okamura | 369/32 |
| 5,491,676 | 2/1996 | Yamaguchi et al. | 369/44.28 |

*Primary Examiner*—James P. Trammell
*Attorney, Agent, or Firm*—Michelle W. Waites

[57] ABSTRACT

A method and apparatus for using one moving system to transmit output data in a pattern that is dependent upon the motion of another moving system is disclosed. More specifically, the present invention enables a line writing device, such as a raster output scanner or a thermal inkjet array, to transmit imaging data to a target, typically an imaging member or a recording medium, in a pattern that is dependent upon the motion of the target. Thus, if motion of the target is altered due to wear and tear, malfunctioning of the printing machine, or for any other reason, the line writing device will adjust its data transmission rate to cause the imaging data to strike its target in the appropriate location.

19 Claims, 4 Drawing Sheets

METHOD AND APPARATUS FOR TRACKING THE MOTION OF AN IMAGING MEMBER WITH A LINE WRITING DEVICE USING A RATIONAL ELECTRONIC GEARBOX

The present invention is directed to a method and apparatus for tracking and controlling the relative motion of two moving systems.

More specifically, the present invention is directed to the use of a rational electronic gearbox to control the velocity and positioning of a line writing device as it discharges an electrophotographic imaging member, or writes directly on paper or other output media. One important aspect is that the invention enables one moving system to track another when both systems are being monitored by encoders that are being operated at different frequencies.

BACKGROUND OF THE INVENTION

The xerographic imaging process begins by charging a photoconductive member to a uniform potential, and then exposing a light image of an original document onto the surface of the photoconductor. Exposing the charged photoconductor to a light image discharges the surface in areas corresponding to non-image areas in the original document while maintaining the charge in image areas. This selective discharging scheme produces an electrostatic latent image of the original document on the surface of the photoconductive member. A developer material is then deposited onto the surface of the photoconductor to transform the latent image into a visible reproduction. The developer typically consists of toner particles with an electrical polarity opposite that of the photoconductive member, which causes them to be naturally drawn to it. A blank copy sheet is then brought into contact with the photoreceptor and heated, thereby permanently affixing the reproduced image to the sheet. This results in a "hard copy" reproduction of the original document or image. The photoconductive member is then cleaned to remove any charge and/or residual developing material from its surface to prepare it for subsequent imaging cycles.

A xerographic printer includes several subsystems which work together to reproduce an original image, and successful operation requires continuous coordination of their relative motion. For example, as the charged photoreceptor moves in the direction lengthwise to the image, a discharging apparatus moves across the photoreceptor, transmitting light to its surface in a designated pattern to discharge it in the appropriate locations. Successful creation of a latent image requires continuous communication between the photoreceptor drive system and the system that controls movement of the discharging device. One way to assure continuous communication between two moving subsystems is to allow one to move one independently and cause the other to track it. Tracking of the independent system typically requires obtaining feedback from the moving parts to provide continuous information about system performance. One device used to obtain continuous feedback from such a subsystem is the High Resolution Position Measurement System (also referred to as a High Resolution Velocity Displacement Measurement (HRDVM) System) disclosed in US-A 5,237,521 to Raj issued Aug. 17, 1993, the contents of which are entirely incorporated by reference. Using this system, the signal obtained from an encoder can be converted to a digital word. Digital words from two or more subsystems can then be compared using a gear ratio between the relevant subsystems to obtain relative speed information. Thus, output from the HRDVM system can be used to control the motion of the tracking system if the tracked system is not operating at the desired performance level.

The subsystems included in a typical xerographic system perform such a wide variety of different functions, that they may or may not be designed and manufactured by the same set of persons. In fact, subsystems that will be placed within the same printer are often designed by persons having little or no knowledge of the design and manufacture constraints of the other subsystems, and are built with minimal consideration of subsystem compatibility. Thus, extensive effort may be required to enable these systems to be communicate once their design and manufacture has been completed.

For example, one type of xerographic printer creates a latent image using an LED bar type raster output scanner (ROS), one type of line writing device for use with the present invention. In this type of printer, the photoreceptor is electrostatically charged, and is transported past the ROS which transmits light pulses in a pattern corresponding to the original image. Meanwhile imaging data is continuously being read from the original image and transmitted to the ROS. A thermal inkjet (TIJ) array is another line writing device that may be used with the present invention. In a TIJ printing system, a reservoir of liquid ink is connected to an ink output orifice via a capillary tube. In the tube, a heater element is provided, responsive to an on/off or binary printing signal. When printing is required and a printing signal is directed to the heater element, the heater element rapidly heats ink in the capillary tube adjacent thereto to a gaseous state, producing a pressure differential which expels a droplet of ink from the orifice. The droplet is directed to a sheet of receiving material such as paper or a similar recording medium, which is rotating in a designated path within the machine.

In either type of printer, two independent moving systems are involved, one which controls transporting of the photoreceptor or recording medium, and one which controls the transmission of data from the line writing device. Difficulties may arise during operation of either of these systems, which may result in undesired changes. For example, wear and tear in the photoreceptor drive system often causes slippage between the gears. This results in sporadic changes to the velocity of the photoreceptor. If the light transmission from the line writing device is not altered accordingly, the photoreceptor will be discharged at the wrong location. Similar wear and tear phenomena may result in sporadic movement of the recording medium, which will cause the thermal printhead to deposit ink at an improper location. Known methods can be incorporated into the printer to cause the line printing device to transmit print data in a pattern that is dependent upon the motion of the target. Linking the motion of the target and the line writing device in this manner enhances the quality of the selective discharging method and provides a more accurate way of creating the latent image.

Control systems of all types include encoders to monitor motion. Some available tracking methods require a one-to-one correspondence between the resolutions of the encoders that monitor the systems involved. That is, the effective operating frequency of the encoder belonging to the tracking system (in this case the line writing device) must be equal to the effective operating frequency of the encoder in the tracked system (i.e. the target). Alternatively, a phased locked loop control system, well known in the art, may be used. A phased locked loop control system typically results in an "n-to-1" correspondence between encoder operating frequencies, n being a whole number. Commonly, but not necessarily, n will be a multiple of two i.e. 2, 4, 6, 8, 16 or 32. In the xerographic printing context, constraints such as these limit the choices for the drive system parameters that should be used to determine the necessary encoder resolution. For example, in a roll system into which an encoder is often placed, a large roll will rotate at a slower rate than a smaller roll attached to the same motor. Thus, when system requirements dictate the use of a large roll, the attached encoder would have to have a correspondingly higher spatial resolution, typically measured as line-pairs/rev, or lp/rev, in order to produce the same operating output frequency. If the resolution of the encoder that must be used is already determined by the line writing system, the only variable left to change might be the drive roll diameter, but space constraints may have already limited this choice.

In addition, when a pre-defined correspondence between encoder operating frequencies is required, it is very difficult to implement changes after the system is designed. Thus, if it were discovered that it would be advantageous to replace an existing part with one that has a different size or that operates at a different speed, considerable time and expense would have to be expended to adjust the system and enable use of the same high resolution encoder. Additionally, requiring the use of a high resolution encoder when it is not needed eliminates the potential for cost/performance improvements such as replacing the encoder with a cheaper, lower density one.

The present invention includes a method and apparatus for controlling a high bandwidth line writing system, and for enabling such a system to track the motion of another system, including a low bandwidth system such as a photoreceptor. The invention includes a "Rational Electronic Gearbox" which can be implemented in virtually any position and velocity control scheme whose goal is to control the relative motion of two systems. The rational electronic gearbox enables encoders or other measuring devices operating at different frequencies to be used in the same system, thus providing a way for easy coordination of independently designed subsystems. It is used in the present invention to enable a line writing printer to be designed with a frequency detection feedback device of appropriate design and effective resolution without having to provide an encoder with the same or integer multiple resolution to control the motion of the photoreceptor or recording medium. A high bandwidth frequency detection device will be required for the line writing device because the device must be able to modulate its data transmission rate at high frequencies. Thus, the present invention overcomes the shortcomings of existing systems in that it will allow a high bandwidth writing device and a low bandwidth photoreceptor (or paper transport TU) system, each with independently, and nearly arbitrarily assigned, encoder resolutions, to exist in the same printer.

The following disclosures may be relevant to various aspects of the present invention:

U.S. Pat. No. 5,237,521 to Raj issued Aug. 17, 1993 discloses a high resolution position measurement system (also referred to as a high resolution digital velocity measurement (HRDVM) system ) which determines the cumulative position and periodic average velocity of a rotating body. The system includes an incremental encoder, for generating a series of periodic signals indicative of rotation of the body, a high frequency clock for generating clock pulses at a frequency greater than the maximum frequency of the encoder signal, and a timer for controlling the total time of a predetermined sample interval. Also included is a counter for accumulating the number of integral encoder signal cycles that have been completed, and an arithmetic logic unit for determining the total number of encoder signal cycles completed, whereby the total is then multiplied by an encoder position conversion factor to determine the cumulative position of the rotating body or belt driven therefrom.

U.S. Pat. No. 5,491,676 to Yamaguchi et al. issued Feb. 13, 1996 discloses a tracking control apparatus having a track jump detection device and a memory for storing driving signals for the tracking control detects a track jump, and when such a track jump has occurred, makes the tracking control inoperative, decelerates the velocity of light beam caused by the track stored in the memory, and, thereby, restarts the tracking control quickly.

U.S. Pat. No. 5,469,414 to Okamura et al. issued Nov. 21, 1995 discloses a positioning control system for a controlled device, such as a disk drive head, estimates a moving time for moving the controlled device from a current position of the controlled device to a newly designated position. The system sets the estimated moving time as a target moving time. Positioning elements then move the controlled device to the designated position in response to the target moving time. The control system may also have a position correcting element included in the control element. The correcting element compares the actual position of the controlled device with a calculated position of the controlled device and makes necessary adjustments.

U.S. Pat. No. 4,716,535 to Yoshida et al. issued, Dec. 29, 1987 discloses a speed detection apparatus for detecting the speed of a rotary machine, or any mechanism which generates pulses at a frequency proportional to its speed. The speed detection apparatus comprises a pulse generator for generating signal pulses proportional to the speed of the machine; a sampling interval setting unit; a counting unit for counting signal pulses generated by the pulse generator in accordance with a sampling interval; and a calculating unit for determining the speed of the machine.

All of the references cited herein are incorporated by reference for their teachings.

Accordingly, although known apparatus and processes are suitable for their intended purposes, a need remains for processes and apparatus for enabling one moving system to track the motion of another, particularly when the two moving systems are operating and providing feedback at different rates. An invention such as this can allow a line writing device to make adjustments to the rate at which it outputs data, in response to unforeseen changes to the motion of a photoreceptor or recording medium.

SUMMARY OF THE INVENTION

In accordance with one aspect of the invention, there is provided a microcontroller for transmitting data from a tracking system being monitored by a tracking device that has a tracking effective spatial resolution, in a pattern that is at least partially dependent upon the motion of a moving target system which is monitored by a targeting device that has a target effective spatial resolution, which includes: a target system measurement apparatus which determines an actual target velocity and positioning value for the target system; an ideal target velocity and positioning reference value; a target system correction device which alters said actual target velocity and positioning value to match said ideal target velocity and positioning reference value; a target system integer scaler which multiplies said actual target velocity and positioning value by the tracking effective spatial resolution; a controller which sends said scaled actual target velocity and positioning value to the tracking system for use as a scaled reference frequency value; a tracking system measurement apparatus which determines an actual tracking velocity and positioning value for the tracking system; a tracking system integer scaler which multiplies said actual tracking velocity and positioning reference value by the target effective spatial resolution to create a scaled actual frequency value; and a tracking system correction device which alters said scaled actual frequency value to match said scaled reference frequency value.

In accordance with another aspect of the invention, there is provided a method of transmitting data from a tracking system being monitored by a tracking device that has a tracking effective spatial resolution, in a manner that is dependent upon the motion of a target system being monitored by a target device that has a target effective spatial resolution, which includes: selecting an ideal target velocity and positioning reference value for the target system; determining an actual target velocity and positioning reference value for the target system; correcting said actual target velocity and positioning reference value to match said ideal target velocity and positioning reference value; scaling said actual target velocity and positioning reference value by multiplying it by the tracking effective spatial resolution; sending said scaled actual target velocity and positioning value to the tracking system for use as a scaled tracking reference frequency value which controls the transmission of data from the tracking system to the target system; determining an actual tracking velocity and positioning reference value; scaling said actual tracking velocity and positioning reference value by the target effective spatial resolution to create a scaled actual tracking frequency value; and correcting said scaled actual tracking frequency value to match said scaled tracking reference frequency value.

In accordance with yet another aspect of the invention, there is provided a microcontroller for transmitting data from a tracking system being monitored by a tracking device that has a tracking effective spatial resolution, in a pattern that is at least partially dependent upon the motion of a moving target system which is monitored by a targeting device that has a target effective spatial resolution, which includes: means for selecting an ideal target velocity and positioning reference value for the target system; means for determining an actual target velocity and positioning reference value for the target system; means for correcting said actual target velocity and positioning reference value to match said ideal target velocity and positioning reference value; means for scaling said actual target velocity and positioning reference value by multiplying it by the tracking effective spatial resolution; means for sending said scaled actual target velocity and positioning value to the tracking system for use as a scaled tracking reference frequency value which controls the transmission of data from the tracking system to the target system; means for determining an actual tracking velocity and positioning reference value; means for scaling said actual tracking velocity and positioning reference value by the target effective spatial resolution to create a scaled actual tracking frequency value; and means for correcting said scaled actual tracking frequency value to match said scaled tracking reference frequency value.

The present invention has significant advantages over current methods of transmitting data from one moving system to another, including the ability to allow the transmitting system to track the motion of the targeted system, thereby increasing the likelihood that the transmitted data will strike the proper location upon the target.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method and apparatus for controlling the relative motion of two moving systems.

More specifically, the present invention is directed to the use of a rational electronic gearbox to control the transmission of imaging data from a line writing device by tracking the motion and positioning of an independently moving target, where the two systems are being monitored by measuring devices that provide feedback at different frequencies.

Figure 1:
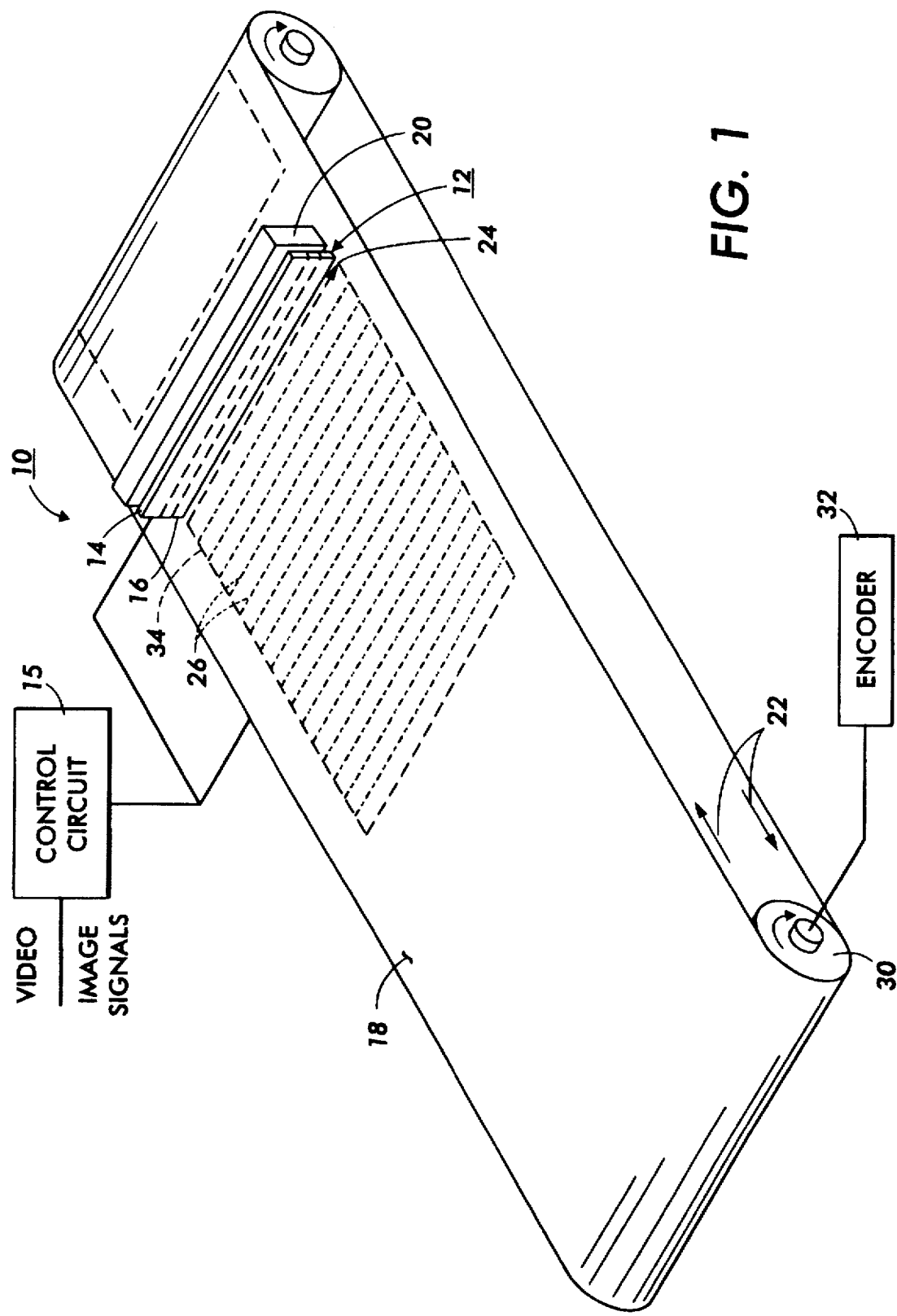
FIG. 1 depicts an elevation view of a LED bar type ROS and a photoreceptor, one set of subsystems that may be used with the present invention.

Referring now to the drawings where the showings are for the purpose of describing an embodiment of the invention and not for limiting same. FIG. 1 illustrates a printing system incorporating a raster output scanner (ROS) 10, one type of high bandwidth line writing device that may be used with the present invention. An exposure station 12 is shown including a light emitting diode (LED) print bar 14. Print bar 14 is selectively addressed by video image signals processed through control circuit 15 to produce a modulated output which is coupled through a respective gradient index lens array 16 onto the surface of charged photoreceptor belt 18. Charging device 20 resides upstream of exposure station 12 to place a predetermined electrical charge on the surface of belt 18. As drive roll 30 rotates clockwise to transport belt 18 in the direction indicated by arrows 22, image area 34 moves past the print bar 14 which provides an exposure pattern in response to the video data input. The exposure pattern begins when the leading edge of the image area reaches a transverse start-of-exposure line represented by dashed line 24. The exposure pattern is formed of a plurality of closely spaced transverse scan lines 26 shown with exaggerated longitudinal spacing on image area 34. Downstream from exposure station 12 development system 28 (not shown) develops a latent image of the exposure. The fully developed image is then transferred to a blank copy sheet. Encoder 32 is attached to drive roll 30 in order to monitor its rotational output.

Usable images are provided in that the information content of the location upon the original document being scanned is represented by the modulated or variant intensity of light respective to its position within the scan width. As the scanning location traverses a charged surface, the electrostatic charge is dissipated in accordance with its light intensity. The electrostatic charge pattern thus produced is developed in the developing station and then transferred to the final copy paper.

Figure 2:
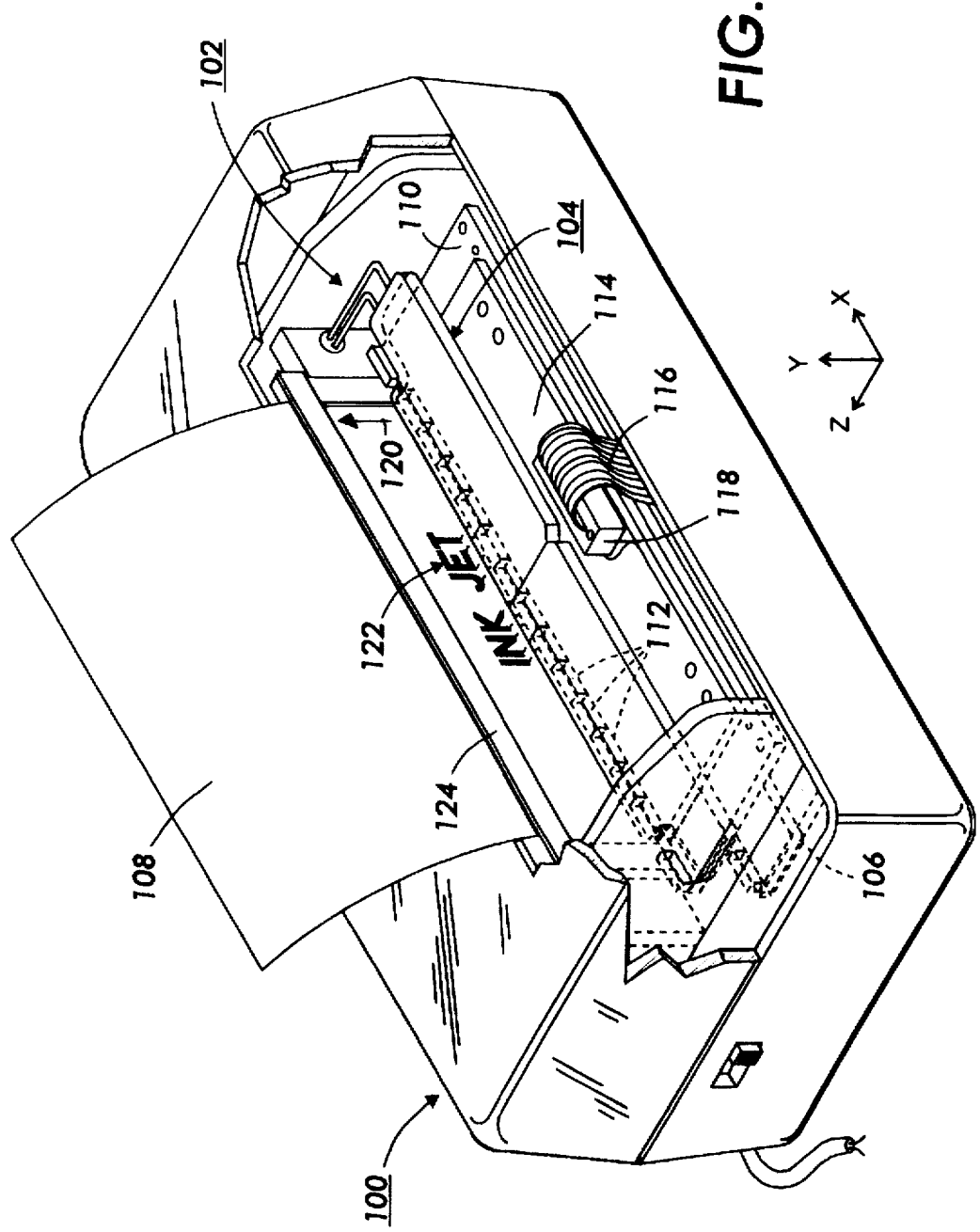
FIG. 2 depicts an elevation view of a thermal inkjet array and recording medium, another set of subsystems that may be used with the present invention.

A thermal inkjet (TIJ) array 102, shown in FIG. 2, is another type of line writing device that may be used with the present invention. Page width printheads 104 and 106 are located within inkjet printer 100 to produce printed output on recording medium or copy sheet 108. Printheads 104 and 106 each comprise a substrate 110, upon which an array of printhead sub-units 112 are affixed in abutted fashion. Alternatively, individual sub-units 112 may be spaced apart from one another by a distance approximately equal to the length of a single sub-unit. In one embodiment, the forward facing edges of sub-units 112 are maintained in close proximity to the surface of sheet 108. Also affixed to substrate 110, at a position behind the abutted sub-unit array, is printed wiring board (PWB) 114, which contains the circuitry required to interface and drive the individual inkjets exposed on the front face of sub-units 112. The data required to drive the individual inkjets of the printhead sub-units is supplied from an external system by a standard printer interface, modified and/or buffered by control logic (not shown) within the printer, and transferred to the printheads via ribbon cable 116 and pin-type connector 118.

As further illustrated in FIG. 2, sheet 108 is fed in the direction of arrow 120 as ink droplets are ejected from the front face of sub-units 112 to produce output image 122 thereon. The copy medium is fed by conventional paper feeding mechanisms, and is maintained in close proximity to the front face of the printheads by one or more paper guides 124. The spacing between the front face of the printhead sub-units where the inkjet nozzles are found and the surface of the copy sheet 108 is important to control the position and size of the ink droplets ejected from the individual nozzles. Furthermore, the spacing between two parallel and adjacent pagewidth printheads, for example printheads 104 and 106, must be maintained within close tolerance.

The devices in FIGS. 1 and 2 require communication between the targeted device (i.e. photoreceptor or recording medium) and the line writing device (i.e. the ROS or thermal inkjet array) in order to accurately reproduce an original image. One successful way of assuring adequate communication between these devices is to devise a system which continuously tracks the position and velocity of the target, and then uses that tracking information to control the rate at which imaging data is transmitted from the line writing device.

Figure 3:
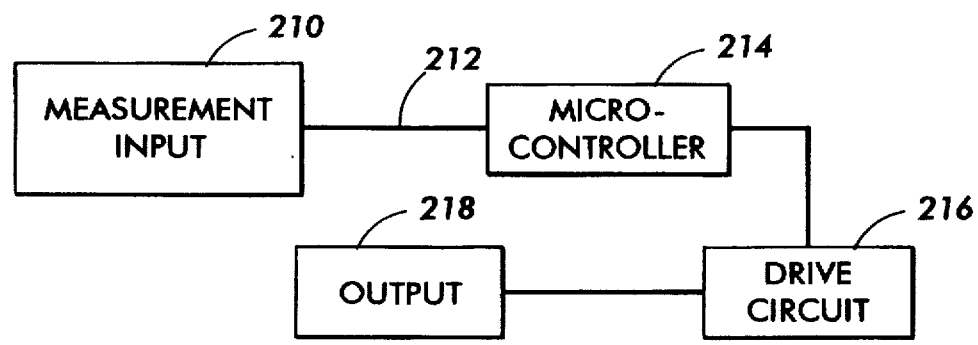
FIG. 3 illustrates one embodiment of the present invention incorporating a prior art measurement system that includes an HRDVM.

FIG. 3 contains a block diagram of the electrical components used to implement a position measurement system presently known in the art. One way a system such as this can be used is to determine the rotary position and velocity of a target such as a photoreceptor or recording medium. In one embodiment of the present invention, the measurement input device, 210 is an encoder, which transmits an alternating signal, via line 212 to microcontroller (µC) 214. Microcontroller 214, includes, among other things, a High Speed Input (HSI) unit which has been programmed to respond to the rising edges of these signals as an interrupt. Subsequent processing of this information, constituting the algorithm referred to previously as HRDVM within the context of a sample-data control system leads to the ability to accurately, and without generating cumulative error, measure the motion that an encoder undergoes during a sample time to resolutions greater than the native spatial resolution of the encoder itself.

While an HRDVM system is disclosed in U.S. Pat. No. 5,237,521 to Raj, described above, an example is given here to further illustrate use of such a scheme with the present invention. Assuming first that rotating member with attached encoder generates a frequency of 2450 Hz. For a sampled-data system with a sampling time of 2 milliseconds, i.e., 500 Hz sampling rate, the measured incremental position of the system, occurring during one sample period using HRDVM would be 2450/500=4.9 encoder pulses (line pairs). In the physical system, this corresponds to a distance traveled by the target within its designated rotational path. Encoder data is input to microcontroller 214, which transmits a control signal to drive circuit 216, which directly drives output 218. In the system described here, output 218 will typically be a motor which controls motion of the moving system, in response to commands received from motor drive circuit 216.

The ideal reference distance that the target should travel during one sample period is a known reference value 302 (shown in FIG. 4), and is dependent upon design constraints of the system. If the measured distance that the target system travels is too small, microcontroller 214 will transmit a signal to motor drive circuit 216, to cause the target control system to increase the rotational speed of the target. Conversely, if the measured distance that the target system travels during a sample period is too long the microcontroller will transmit a signal to the target control system to cause the rotational speed of target to decrease by the appropriate amount. In this manner, the output of the µC is regulated in response to feedback from the target control system including feedback of the position of the target, as well as its velocity.

Information about the rate and accuracy of the transmission of imaging data from the line writing device is obtained in substantially the same manner as described above. Referring again to FIG. 3, virtually the same components may be used to implement a system presently available for determining the frequency and change in phase of a high bandwidth system such as a line writing device. The circuit basically remains unchanged in that a measuring device provides data to microcontroller 214 which includes an HRDVM system system. However in the case of a line writing device, instead of an encoder, measuring device 210 is one that creates TTL compatible square waves from the occurrence of pulses to signify the firing of the line writing device, e.g., the TIJ print head. This train of square waves is then fed into the HRDVM, within the microcontroller in exactly the same manner as described for the encoder that measured the incremental motion of the target as described above. That is, via line 212 to microcontroller 214. Processing of these TTL compatible square waves allows the number of times the line writing device fires during the sample period to be counted.

This system may accurately be described as one which measures the incremental phase of the line writing device during a sample time just as described for the combination of encoder 210, and HRDVM, 200, which measures the incremental position traveled by the target system. As described, the target velocity is analogous to the frequency of the line-writing device, while the target position corresponds to its phase.

The incremental phase measuring device will be used to provide feedback for control of the TIJ print head firing rate. Once TTL data has been processed at microcontroller 214 the information obtained from the incremental measurement device is transmitted to drive circuit 216, which determines the proper transmission rate for data to be emitted from the line writing device via output circuit 218. This again allows the output of the µC to be regulated in response to feedback from the line writing device.

While it is certainly possible to independently determine ideal values for all of these systems, such a determination is only useful if all of the systems which must work together are operating under ideal conditions. Under actual printer operating conditions, factors such as wear and tear of the parts which drive the control systems, and diminished output from the line writing device, such as that caused by reduced light intensity or clogging of the inkjet nozzles, must be accounted for. Thus, it is most desirable to devise a method of causing the input parameters for one system to be determined by the output of the other system. This way, if the rate at which the target rotates is slowed down, the line writing device can respond by transmitting imaging data at a slower rate. Alternatively, it might also be possible to speed or slow the rotational rate of the target in response to a change in the imaging data transmission rate.

Figure 4:
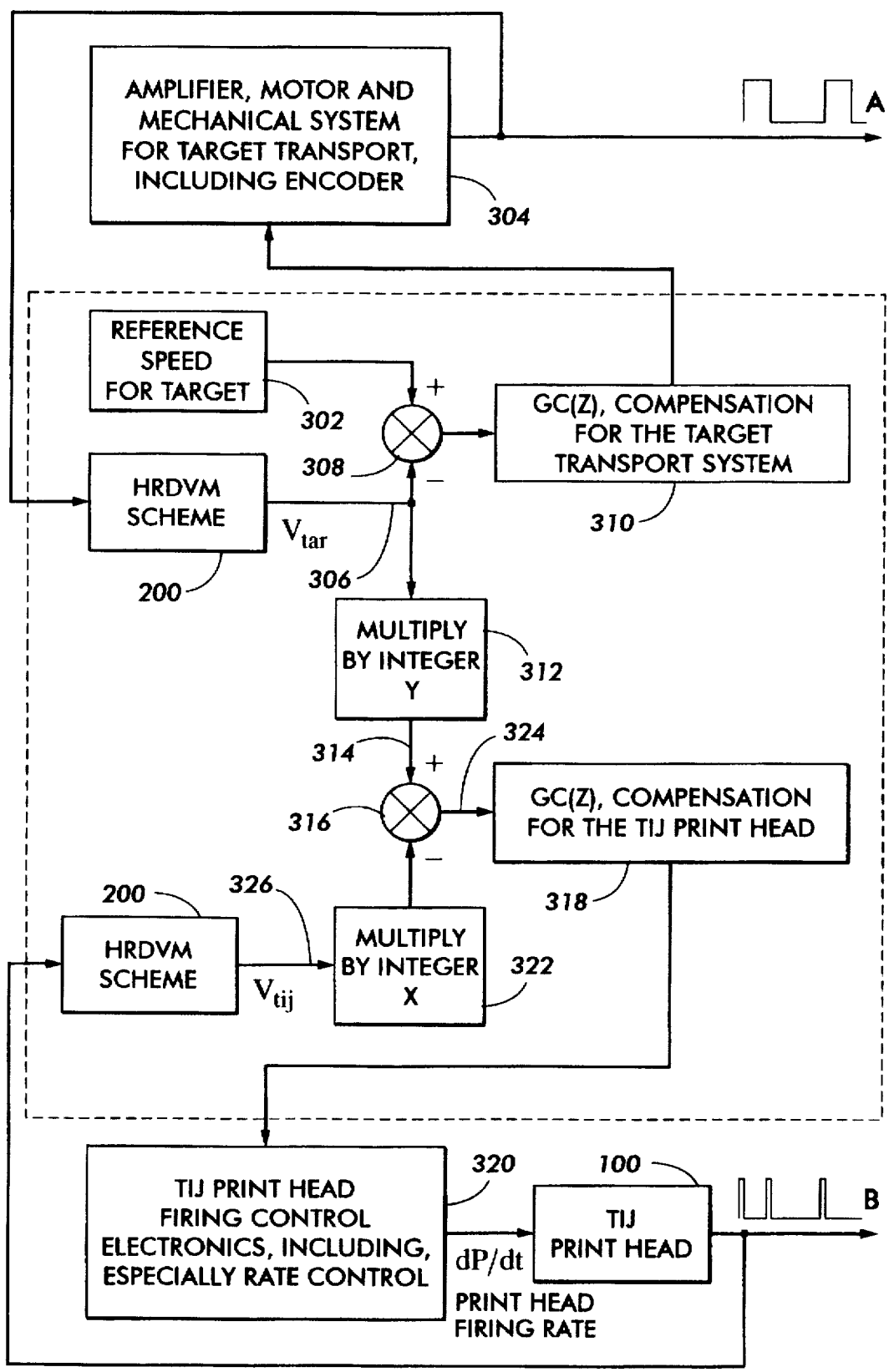
FIG. 4 illustrates the rational electronic gearbox used to implement the present invention.

FIG. 4 illustrates a block diagram of the electrical components used in the present invention. As indicated above, a system such as this can be used to control the relative positioning and velocities of multiple moving systems being monitored by encoders that have different resolutions. In this system, as obvious to those of ordinary skill in the art, it is most desirable to use the high bandwidth system, here the line writing device, to track the low bandwidth transport system as its target.

With continued reference to FIG. 4, the two systems are connected such that the output of the target control system 100 is used to control the firing rate of the line writing device, here TIJ array 110, and also ROS 10 (shown in FIG. 1). Also included in FIG. 4 are two HRDVM systems, one for the target control system and the other for the line writing device control electronics. It should be noted that other velocity and positioning measurement systems may replace either or both of the HRDVM systems, and that the present invention is not limited to its use.

A known reference value 302 must first be provided, which indicates the ideal velocity and position profile for the target. The target will move and generate, by virtue of its included encoder, signal pattern A shown at the top of FIG. 4. This signal, indicative of the motion of the target, is input to the HRDVM system, which determines its actual velocity and relative positioning, identified as $V_{tar}$ 306 in the illustration. These two numbers are compared at location 308 and supplied to compensation block 310, where the actual motion of the target may be altered to match that of ideal reference value 302, to correct any resulting error. Thus, if ideal reference value 302 is slower than $V_{tar}$ 306, the speed of the target will be decreased at step 310 until it matches the ideal value 302. If the ideal value is faster than the actual value 306, the speed of the target will be increased at step 310 until it matches ideal value 302. Finally, if the actual and ideal values are equal, no correction will be provided.

More importantly with regard to the present invention, $V_{tar}$ is also provided to block 312, where it is multiplied by integer Y and compared to the similar measurement, $V_{nj}$ 326 of the firing frequency for the line writing device after its multiplication by integer X at block 322. The generated error, shown at location 324, is input to compensation block 318 and then to the TIJ print head firing electronics, 320, to modulate the rate of firing in accordance with changes in speed of the target system. Choice of the integers X and Y, which constitute the electronic rational gear ratio, can be best understood by example. Assume it is desired to write lines on the target at a spatial frequency of 600 lines per inch. If the target system was designed such that each encoder pulse represented 1/712 inches of travel then the values of X, and Y would be 712 and 600 respectively, resulting in the following ideal relationship between the speed of the target system and the frequency of the line writing system:

$$V_{nj}=(600)* V_{tar}/(712)$$

The resultant electronic gear ratio, a rational number because of the integer values used in the denominator and numerator, is not a function of the target system's absolute, desired velocity, but only of the physical dimensions of target drive elements and choice of target encoder resolution as well as the desired spatial resolution of the written lines.

It is, therefore, apparent that there has been provided in accordance with the present invention, a method an apparatus for controlling the motion of two systems being monitored by encoders that have different frequencies that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A microcontroller for transmitting data from a tracking system being monitored by a tracking device that has a tracking effective spatial resolution, in a pattern that is at least partially dependent upon the motion of a moving target system which is monitored by a targeting device that has a target effective spatial resolution, comprising:

a) a target system measurement apparatus which determines an actual target velocity and positioning value for the target system;

b) an ideal target velocity and positioning reference value;

c) a target system correction device which alters said actual target velocity and positioning value to match said ideal target velocity and positioning reference value;

d) a target system integer scaler which multiplies said actual target velocity and positioning value by the tracking effective spatial resolution;

e) a controller which sends said scaled actual target velocity and positioning value to the tracking system for use as a scaled reference frequency value;

f) a tracking system measurement apparatus which determines an actual tracking velocity and positioning value for the tracking system;

g) a tracking system integer scaler which multiplies said actual tracking velocity and positioning reference value by the target effective spatial resolution to create a scaled actual frequency value; and h) a tracking system correction device which alters said scaled actual frequency value to match said scaled reference frequency value.

2. A microcontroller as claimed in claim 1 wherein the tracking effective spatial resolution is not equal to the target effective spatial resolution.

3. A microcontroller as claimed in claim 1 wherein the target system is a xerographic imaging member.

4. A microcontroller as claimed in claim 1 wherein the target system is a xerographic recording medium.

5. A microcontroller as claimed in claim 1 wherein the tracking system is a line writing device.

6. A microcontroller as claimed in claim 5 wherein the line writing device is a raster output scanner.

7. A microcontroller as claimed in claim 5 wherein the line writing device is a thermal inkjet array.

8. A microcontroller as claimed in claim 1 wherein a ratio of the tracking effective spatial resolution to the target effective spatial resolution is a rational number that is the ratio of two integers.

9. A method of transmitting data from a tracking system being monitored by a tracking device that has a tracking effective spatial resolution, in a manner that is dependent upon the motion of a target system being monitored by a target device that has a target effective spatial resolution, comprising:
   a) selecting an ideal target velocity and positioning reference value for the target system;
   b) determining an actual target velocity and positioning reference value for the target system;
   c) correcting said actual target velocity and positioning reference value to match said ideal target velocity and positioning reference value;
   d) scaling said actual target velocity and positioning reference value by multiplying it by the tracking effective spatial resolution;
   e) sending said scaled actual target velocity and positioning value to the tracking system for use as a scaled tracking reference frequency value which controls the transmission of data from the tracking system to the target system;
   f) determining an actual tracking velocity and positioning reference value;
   g) scaling said actual tracking velocity and positioning reference value by the target effective spatial resolution to create a scaled actual tracking frequency value; and
   h) correcting said scaled actual tracking frequency value to match said scaled tracking reference frequency value.

10. A method of transmitting data as claimed in claim 9 wherein said transmitted data is imaging data.

11. A method of transmitting data as claimed in claim 9 wherein said actual target velocity and positioning reference value determining step further comprises using a high resolution position measurement system to obtain a velocity and cumulative change in position of the target system.

12. A method of transmitting data as claimed in claim 9 wherein said actual tracking velocity and positioning reference value determining step further comprises using a high resolution position measurement system to obtain a frequency and cumulative change in phase of the tracking system.

13. A microcontroller for transmitting data from a tracking system being monitored by a tracking device that has a tracking effective spatial resolution, in a pattern that is at least partially dependent upon the motion of a moving target system which is monitored by a targeting device that has a target effective spatial resolution, comprising:
   a) means for selecting an ideal target velocity and positioning reference value for the target system;
   b) means for determining an actual target velocity and positioning reference value for the target system;
   c) means for correcting said actual target velocity and positioning reference value to match said ideal target velocity and positioning reference value;
   d) means for scaling said actual target velocity and positioning reference value by multiplying it by the tracking effective spatial resolution;
   e) means for sending said scaled actual target velocity and positioning value to the tracking system for use as a scaled tracking reference frequency value which controls the transmission of data from the tracking system to the target system;
   f) means for determining an actual tracking velocity and positioning reference value;
   g) means for scaling said actual tracking velocity and positioning reference value by the target effective spatial resolution to create a scaled actual tracking frequency value; and
   h) means for correcting said scaled actual tracking frequency value to match said scaled tracking reference frequency value.

14. A microcontroller as claimed in claim 13 wherein the tracking effective spatial resolution is not equal to the target effective spatial resolution.

15. A microcontroller as claimed in claim 13 wherein the target system is a xerographic imaging member.

16. A microcontroller as claimed in claim 13 wherein the target system is a recording medium.

17. A microcontroller as claimed in claim 13 wherein the tracking system is a line writing device.

18. A microcontroller as claimed in claim 17 wherein said line writing device is a raster output scanner.

19. A microcontroller as claimed in claim 17 wherein said line writing device is a thermal inkjet array.

\* \* \* \* \*